(12) United States Patent
Beck et al.

(10) Patent No.: US 10,018,253 B2
(45) Date of Patent: Jul. 10, 2018

(54) TRANSMISSION FOR A VEHICLE (71) Applicant: ZF Friedrichshafen AG, Friedrichshafen (DE)

(72) Inventors: Stefan Beck, Eriskirch (DE); Viktor Warth, Friedrichshafen (DE); Michael Wechs, Weißensberg (DE); Martin Brehmer, Tettnang (DE)

(73) Assignee: ZF FRIEDRICHSCHAFEN AG, Friedrichshafen (DE)

( * ) Notice: Subject to any disclaimer, the term of this patent is extended or adjusted under 35 U.S.C. 154(b) by 0 days.

(21) Appl. No.: 15/277,373

(22) Filed: Sep. 27, 2016

(65) Prior Publication Data

US 2017/0089430 A1 Mar. 30, 2017

(30) Foreign Application Priority Data

Sep. 28, 2015 (DE) ........................ 10 2015 218 572

(51) Int. Cl.
*F16H 3/66* (2006.01)
*B60K 6/365* (2007.10)
(Continued)

(52) U.S. Cl.
CPC ................ *F16H 3/66* (2013.01); *B60K 6/365* (2013.01); *B60Y 2300/70* (2013.01);
(Continued)

(58) Field of Classification Search
CPC ............... F16H 3/66; F16H 2200/2064; F16H 2200/2094; F16H 2200/201;
(Continued)

(56) References Cited

U.S. PATENT DOCUMENTS 4,229,996 A 10/1980 Hildebrand
5,106,352 A 4/1992 Lepelletier
(Continued)

FOREIGN PATENT DOCUMENTS

DE 2945232 A1 6/1980
DE 3131138 A1 2/1983
(Continued)

OTHER PUBLICATIONS

European Search Report EP15187087.0-1752, dated Mar. 30, 2016. (15 pages).

*Primary Examiner* — David J Hlavka
(74) *Attorney, Agent, or Firm* — Dority & Manning, P.A.

(57) ABSTRACT

A transmission for a motor vehicle includes a first planetary gear set with at least three central gears which are formed by a ring gear and two sun gears or by two ring gears and one sun gear. A second planetary gear set includes two central gears which are formed by one ring gear and one sun gear. One of the central gears of the second planetary gear set is constantly connected in a torque-proof manner to one of the central gears of the first planetary gear set. The one of the central gears of the first planetary gear set differs from and is arranged in a common gear set plane with the one of the central gears of the second planetary gear set. A carrier of the first planetary gear set is constantly connected in a torque-proof manner to a carrier of the second planetary gear set.

25 Claims, 8 Drawing Sheets

(51) Int. Cl.
*F16H 3/72* (2006.01)
*F16H 3/44* (2006.01)

(52) U.S. Cl.
CPC ........ *F16H 3/724* (2013.01); *F16H 2003/442* (2013.01); *F16H 2200/0052* (2013.01); *F16H 2200/0086* (2013.01); *F16H 2200/201* (2013.01); *F16H 2200/2007* (2013.01); *F16H 2200/2046* (2013.01); *F16H 2200/2064* (2013.01); *F16H 2200/2094* (2013.01); *Y10S 903/919* (2013.01)

(58) Field of Classification Search
CPC ....... F16H 2003/442; F16H 2200/0052; F16H 2200/0086; F16H 2200/2046; F16H 3/724; F16H 2200/2007; B60K 6/365
See application file for complete search history.

(56) References Cited

U.S. PATENT DOCUMENTS

| | | | |
|---|---|---|---|
| 7,604,563 B2* | 10/2009 | Phillips | F16H 3/663 475/280 |
| 8,206,257 B2 | 6/2012 | Gumpoltsberger et al. | |
| 8,435,154 B1* | 5/2013 | Mellet | F16H 3/62 475/278 |
| 8,617,022 B1 | 12/2013 | Vernon et al. | |
| 8,708,860 B2* | 4/2014 | Hart | F16H 3/663 475/275 |
| 8,715,130 B2* | 5/2014 | Mellet | F16H 3/62 475/277 |
| 8,721,488 B2* | 5/2014 | Mellet | F16H 3/725 475/276 |
| 9,109,668 B2* | 8/2015 | Thomas | F16H 3/62 |
| 2010/0041507 A1* | 2/2010 | Gumpoltsberger | F16H 3/663 475/275 |
| 2010/0183807 A1* | 7/2010 | Kim | H01L 21/67017 427/248.1 |
| 2011/0183807 A1* | 7/2011 | Gumpoltsberger | F16H 3/66 475/288 |

FOREIGN PATENT DOCUMENTS

| | | |
|---|---|---|
| DE | 3818710 C1 | 1/1990 |
| DE | 102008041192 A1 | 2/2010 |

\* cited by examiner

| | 03b | 05b | 06b | 13b | 16b | 17b |
|---|---|---|---|---|---|---|
| 1b | | X | | X | | |
| 2b | | X | | | X | X |
| 3b | | X | | X | X | |
| 4.1b | | | | X | X | X |
| 4.2b | | | | | X | X |
| 4.3b | | | | | | X |
| 5b | X | | | X | | |
| 6b | X | | | | | |
| R1b | | | X | | | |
| R2b | | | X | | | X |

|      | 03c | 04c | 05c | 13c | 15c | 16c |
|------|-----|-----|-----|-----|-----|-----|
| 1c   |     | X   |     | X   |     |     |
| 2c   |     | X   |     |     |     | X   |
| 3c   |     | X   |     |     | X   |     |
| 4.1c |     |     |     | X   | X   |     |
| 4.2c |     |     |     | X   |     | X   |
| 4.3c |     |     |     |     | X   | X   |
| 5c   | X   |     |     |     | X   |     |
| 6c   | X   |     |     |     |     | X   |
| R1c  |     |     | X   | X   |     |     |
| R2c  |     |     | X   |     |     | X   |

TRANSMISSION FOR A VEHICLE

FIELD OF THE INVENTION

The invention relates generally to a transmission for a motor vehicle. Herein, a transmission in particular designates a multi-speed transmission, with which a multitude of gears, thus fixed transmission ratio relationships between the drive shaft and the output shaft of the transmission, are shiftable by shifting elements, preferably automatically. Here, the shifting elements comprise, for example, clutches or brakes. Such transmissions are primarily used in automotive applications, in order to adjust the rotational speed and torque output characteristics of the drive unit to the driving resistance of the vehicle in a suitable manner.

BACKGROUND

Patent application DE 31 31 138 A1 of the applicant describes a load-shiftable planetary gear change-speed transmission with several coupled planetary gear sets. Therein, a staged planetary gear set is used, on the carrier of which planetary gears with different effective diameters are arranged. In the embodiment according to FIG. 11, an inner central gear meshes with the larger effective diameter of the planetary gears, and two outer central gears mesh with each of the two effective diameters of the planetary gears of the staged planetary gear set. Thus, the staged planetary gear set features a total of four shafts in the order of rotational speeds. Subsequently, one of the two outer central gears is connected to an inner central gear of a second planetary gear set formed as a positive gear set.

Patent application DE 10 2008 041 192 A1 of the applicant describes a multi-speed transmission, whereas a first and fourth planetary gear set are arranged in a common gear set plane. Thereby, the ring gear of the fourth planetary gear is firmly connected to a sun gear of the first planetary gear set. The two carriers of the first and fourth planetary gear sets are likewise firmly connected to each other. Thus, the first and fourth planetary gear sets together feature a total of four shafts in the order of rotational speeds.

Moreover, in the state of the art, a multitude of vehicle transmissions are known, with which the formation of gears takes place through fixed rotational speed relationships of the shafts of the planetary gear set system that is coupled multiple times, which feature one order of rotational speeds with each other. As an example, U.S. Pat. No. 5,106,352 A is known, with which two different sized rotational speed paths are transmitted to a planetary gear set that is coupled twice, which features four shafts in the order of rotational speeds.

A system with a total of five shafts in the order of rotational speeds already offers a high degree of freedom for the formation of gears. The five shafts are characterized in that the rotational speeds of such shafts increase, decrease or remain the same in a linear fashion in the specified sequence. In other words, the rotational speed of the first shaft is less than or equal to the rotational speed of the second shaft. In turn, the rotational speed of the second shaft is less than or equal to the rotational speed of the third shaft. The rotational speed of the third shaft is less than or equal to the rotational speed of the fourth shaft. The rotational speed of the fourth shaft is less than or equal to the rotational speed of the fifth shaft. This sequence is also reversible, such that the fifth shaft features the lowest rotational speed, while the first shaft assumes a rotational speed that is greater than or equal to the rotational speed of the fifth shaft. Thereby, there is always a linear relationship between the rotational speeds of all five shafts. Thereby, the rotational speed of one or more of the five shafts may also assume negative values, or even the value of zero. Therefore, the order of rotational speeds is always to refer to the signed value of the rotational speeds, and not to their amount.

If the rotational speed of two of the five shafts is given as fixed, the rotational speeds of the remaining three shafts are specified. A planetary gear set system with five shafts is in the order of rotational speeds, but can only be achieved through the coupling of at least three individual planetary gear sets. This requires a significant structural complexity, and increases the size of the transmission compared to a planetary gear set system with only four shafts in the order of rotational speeds.

The change-gear transmission according to FIG. 1 of the patent DE 38 18 710 C1 actually includes six shafts in the order of rotational speeds. For this purpose, a total of two sun gears and two ring gears are allocated to dual planetary gears of a planetary gear set. A sun gear of an additional individual planetary gear set formed as a negative gear set is firmly connected to each sun gear, which meshes with the smaller diameter of the dual planetary gears. The carrier on which the dual planetary gears are rotatably mounted is firmly connected to the carrier of the additional individual planetary gear set. The additional individual planetary gear set is arranged axially adjacent to the dual planetary gears, by which the axial structural length of the transmission is increased.

The axial structural length of a transmission is of great importance for use in the motor vehicle drive train. Particularly with vehicles with drive trains arranged transversely to the direction of travel of the motor vehicle, attention must be paid to a particularly short axial structural length, since, in the axial conjunction with the internal combustion engine and (if applicable) a start-up element, the transmission is arranged between the longitudinal beams of the front section of the motor vehicle. With hybrid vehicles, an electric motor is also added to this conjunction, by which the need for installation space of the drive train is further increased.

SUMMARY OF THE INVENTION

As such, exemplary aspects of the invention provide a transmission for a motor vehicle that features at least five shafts in the order of rotational speeds and is distinguished by a particularly short axial structural length.

The transmission features a first planetary gear set formed as a stepped or staged planetary gear set and a second planetary gear set. The planetary gears of the first planetary gear set feature at least two differently sized effective diameters. The first planetary gear set features at least three central gears, thus sun gears and ring gears. Accordingly, the first planetary gear set features at least either two sun gears and one ring gear or one sun gear and two ring gears. The two central gears of the same type, that is, the two sun gears or the two ring gears, are allocated with different effective diameters of the planetary gears. The second planetary gear set features two central gears in the form of one ring gear and one sun gear. One of the central gears of the second planetary gear set, thus its ring gear or its sun gear, is constantly connected in a torque-proof manner to one of the central gears of the first planetary gear set.

In accordance with exemplary aspects of the invention, the type of the central gear of the second planetary gear set differs from the type of that central gear of the first planetary gear set to which it is constantly connected. Accordingly, the constant torque-proof connection of the central gears does not exist between the two ring gears or between the two sun gears; rather, it exists between a ring gear and a sun gear. The two central gears of different types that are connected in such a way are arranged in a common gear set plane. A carrier of the first planetary gear set is constantly connected in a torque-proof manner to a carrier of the second planetary gear set.

Through this allocation in accordance with exemplary aspects of the invention, a transmission with at least five shafts in the order of rotational speeds is provided. Two of the five shafts are formed by at least two free central gears of the first planetary gear set. An additional shaft is formed by the carriers that are connected to each other. An additional shaft is formed by the central gears, which are connected in a torque-proof manner to each other, of the first and second planetary gear set. An additional shaft is formed by the free central gear of the second planetary gear set.

Through the constant sun gear/ring gear coupling of the two planetary gear sets in one gear set plane, the transmission is characterized by a particularly short axial structural length. In this connection, the common gear set plane means that the sun gear/ring gear coupling of the two planetary gear sets is arranged in a sectional plane of the transmission perpendicular to the main transmission axis. Therefore, the two central gears, which are constantly connected to each other, of the two planetary gear sets are not arranged axially adjacent to each other. Instead, the central gears, which are constantly connected to each other, of the two planetary gear sets are essentially arranged radially one above the other, in a common plane.

The constant torque-proof connection of the two carriers is particularly advantageous in terms of design, because, given the rotational mounting of the planetary gears, the carrier of a planetary gear set features a relatively complex geometry. In combination with the sun gear/ring gear coupling in one gear set plane, the constant connection of the two carriers enables a design as a one-piece component, which can receive both the carrier of the first planetary gear set and the carrier of the second planetary gear set. This favors the compact design of the transmission, since no interfaces are necessary. However, a structurally separate design of the two carriers is also conceivable, since, given the complexity of the carriers, designs that are likewise compact with a torque-proof interface are possible.

Both the first and the second planetary gear sets may also be formed as positive gear sets. A positive gear set differs from a negative gear set in such a way that the positive gear set features inner and outer planetary gears, which are rotatably supported on the carrier. Thereby, the toothing of the inner planetary gears meshes, on the one hand, with the toothing of the sun gear and, on the other hand, with the toothing of the outer planetary gears. In addition, the toothing of the outer planetary gears meshes with the toothing of the ring gear. This has the consequence that, with a fixed carrier, the ring gear and the sun gear rotate in the same direction of rotation. With a planetary gear set formed as a staged planetary gear set, an additional outer set of planetary gears may be allocated with only one of the two effective diameters of the planetary gears, while the other effective diameter meshes directly with the sun gear and the ring gear.

Preferably, the carriers connected to each other of the first and second planetary gear sets are constantly connected to an output shaft of the transmission. Such a constant connection may also be present if the carriers are a fixed component of the output shaft. An allocation of the carriers to the output shaft is advantageous in terms of the component stress, since, with a planetary gear set acting as a negative gear set, the carrier always acts as a sum shaft. The central gears acting as differential shafts are thus always less stressed than the sum shaft, by which the stress of the central gears acting as differential shafts is always below the output torque.

According to one exemplary embodiment, the first planetary gear set features four central gears, that is, two sun gears and two ring gears. Each of the two sun gears meshes with a different effective diameter of the planetary gears, and each of the two ring gears in the same manner. Thereby, the transmission is extended by a free shaft, and accordingly forms a transmission with six shafts in the order of rotational speeds. Thereby, the options for forming gears are further increased.

Preferably, one of the central gears of the first planetary gear set, which is not constantly connected in a torque-proof manner to any of the central gears of the second planetary gear set, can be fixed in a torque-proof manner by a shifting element. If, for example, a central gear, formed as a ring gear, of the first planetary gear set is involved in the sun gear/ring gear coupling between the first and second planetary gear sets, and the first planetary gear set features two central gears formed as sun gears, one or each of such two sun gears may be assigned with a shifting element for torque-proof fixing. Thus, by locking the shifting element, one of the five or six shafts of the transmission is fixed in a torque-proof manner. If a rotational speed at an additional shaft is given as fixed, the rotational speeds of all additional shafts are specified. Thereby, the torque-proof ability to fix to central gears of the same type, thus to two sun gears or to two ring gears, is particularly advantageous, as this simplifies the structure of the transmission.

Preferably, that central gear of the second planetary gear set that is not constantly connected in a torque-proof manner to any of the central gears of the first planetary gear set can be fixed in a torque-proof manner by an additional shifting element. If, for example, the central gear, formed as a sun gear, of the second planetary gear set is involved in the sun gear/ring gear coupling between the first and second planetary gear sets, the ring gear, formed as a central gear, of the second planetary gear set can be fixed in a torque-proof manner. The second planetary gear set's central gear's torque-proof ability to fix facilitates, particularly with a smaller stationary transmission ratio of the second planetary gear set compared to the stationary transmission ratios of the first planetary gear set formed as a staged planetary gear set, the formation of gears with shorter transmission ratios, thus starting gears.

According to one exemplary embodiment, at least one of the central gears of the first planetary gear set, which is not constantly connected in a torque-proof manner to any of the central gears of the second planetary gear set, is connectable to a drive shaft of the transmission by a shifting element. A shiftable connection of the drive shaft at at least one of five or six shafts of the transmission gear facilitates the formation of gears. Through the arrangement of this shiftable connection at at least one free central gear of the first planetary gear set, a large stationary transmission ratio of the first planetary gear set formed as a staged planetary gear set can be used. Advantageously, a shiftable connection to the drive shaft can take place at two free central gears of the first planetary gear set.

Preferably, that central gear of the second planetary gear set that is not constantly connected in a torque-proof manner to any of the central gears of the first planetary gear set is connectable to the drive shaft by a shifting element. Such a connection at the free central gear of the second planetary gear set is, particularly with a relatively small stationary transmission ratio of the second planetary gear set, advantageous for the formation of long gears, with which the output shaft speed is higher than the drive shaft speed.

The sun gear/ring gear coupling between the first and second planetary gear sets is preferably not allocated with a shiftable connection at the drive shaft and/or a torque-proof ability to fix. This is because the sun gear/ring gear coupling can be surrounded on both sides by the connection of the two carriers, by which accessibility is restricted. However, embodiments that feature such a shiftable connection at the sun gear/ring gear coupling are also conceivable. This may even lead to a simplification of the transmission, particularly if the transmission only comprises five shafts in the order of rotational speeds.

According to one exemplary embodiment, the central gear, formed as a sun gear, of the second planetary gear set is constantly connected in a torque-proof manner to that central gear, formed as a ring gear, of the first planetary gear set that meshes with the smaller effective diameter of the planetary gears. Through the connection at the smaller ring gear of the first planetary gear set, a radially compact structure of the transmission is favored. For this purpose, it is advantageous to design the central gear formed as a sun gear of the first planetary gear set, which meshes with the larger effective diameter of the planetary gears, fixable in a torque-proof manner by a first shifting element. It is further advantageous to design the central gear, formed as a sun gear, of the first planetary gear set, which meshes with the smaller effective diameter of the planetary gears, fixable in a torque-proof manner by a second shifting element. The central gear, formed as a ring gear, of the second planetary gear set is preferably to be designed fixable in a torque-proof manner by a third shifting element. Such ring gear can be connectable to the drive shaft of the transmission by locking a fourth shifting element. The central gear, formed as a ring gear, of the first planetary gear set, which meshes with the larger effective diameter of the planetary gears, is preferably connectable to the drive shaft of the transmission by a fifth shifting element. A transmission with such an allocation of the individual transmission elements features a compact design, low component stress and a good toothing efficiency.

Through the selective locking in pairs of the first to fifth shifting elements, at least six forward gears between the drive shaft and the output shaft can be represented. The first forward gear is formed by locking the third shifting element and the fifth shifting element. The second forward gear is formed by locking the second shifting element and the fifth shifting element. The third forward gear is formed by locking the first shifting element and the fifth shifting element. The fourth forward gear is formed by locking the fourth shifting element and the fifth shifting element. The fifth forward gear is formed by locking the first shifting element and the fourth shifting element. The sixth forward gear is formed by locking the second shifting element and the fourth shifting element. Thereby, with a suitable selection of the stationary transmission ratios of the planetary gear set, a transmission ratio sequence that is well-suited for application in a motor vehicle is achieved. In addition, two adjacent forward gears always feature a shifting element, which is locked in both of these gears. This simplifies the shifting process and shortens the shifting time between adjacent forward gears. Since the fifth shifting element is locked in the first to fourth forward gears, the shifting diagram enables such a simplified shifting process between each of the first four forward gears. This also applies to a shifting process between the forward gears four and six or three and five, as the case may be, since, in such gears, the fourth shifting element or the first shifting element, as the case may be, is locked.

The central gear formed as a sun gear of the first planetary gear set, which meshes with the larger effective diameter of the planetary gears, can be connected to the drive shaft by a sixth shifting element. Thereby, the formation of a reverse gear between the drive shaft and the output shaft is made possible, specifically by locking the third shifting element and the sixth shifting element. An additional optional reverse gear is possible by locking the second shifting element and the third shifting element. The additional reverse gear is characterized by a higher transmission ratio than the reverse gear formed by locking the third and sixth shifting elements.

According to a possible exemplary embodiment, the transmission features an electric motor with a rotatable rotor and a torque-proof stator. Thereby, the rotor is constantly connected to the drive shaft. Thereby, the transmission may take over functions such as boosting or recuperation in a hybrid drive train of a motor vehicle. Through the reverse rotation of the rotor counter to a preferred direction of rotation of the drive shaft and an engaged forward gear, the output shaft can be rotated in reverse, by which a reverse movement of a motor vehicle is made possible with such a transmission. Alternatively, a connection of the electric machine to another shaft of the transmission is also conceivable.

In principle, each of the six shifting elements can be formed as a positive-locking shifting element, for example as a claw coupling, or as a force-fitting shifting element, for example as a multi-disk clutch. Preferably, the third and/or fifth shifting elements are formed as positive-locking shifting elements. In the locked state, positive-locking shifting elements establish the connection through positive-locking fit, and, in the open state, are distinguished by lower drag losses as force-fitting shifting elements. Due to the low drag losses in the open state, the efficiency of the transmission is improved, particularly since the third shifting element is only locked in the first of the six forward gears. Thus, the third shifting element is predominantly open during the operation of the transmission in the drive train of a motor vehicle.

In a known manner, the transmission may be upstream of a starting element, for example a wet or a dry starting clutch or a hydrodynamic torque converter, in order to, upon a starting process, enable a rotational speed compensation between a drive unit external to the transmission and the drive shaft. Alternatively, a shifting element internal to the transmission can be provided as a starting element, which must be formed as a force-fitting shifting element. Preferably, the third shifting element is used for this purpose, since the third shifting element is locked in the first forward gear and, if applicable, also in the reverse gear. Alternatively, the fifth shifting element may be called on as a starting element for starting in the forward direction. In this case, the sixth shifting element may be called on as a starting element in the reverse direction.

A constant connection is referred to as a connection between two elements, which always exists. Elements that are constantly connected in such a manner always rotate with the same dependence between their rotational speeds. In a constant connection between two elements, a shifting element cannot be found. Therefore, a constant connection is to be distinguished from a shiftable connection. A constant torque-proof connection is understood to be a connection with which the elements connected to each other always rotate with the same rotational speed.

In connection with the formation of gears, the term "locking of a shifting element" is understood to be a process with which the shifting element is controlled in such a manner that a high degree of torque is transferred at the end of the locking process. While positive-locking shifting elements in the "locked" state do not permit a differential rotational speed, with force-fitting shifting elements in the "locked" state, the formation of a small differential rotational speed between the shifting element halves is possible, intentionally or unintentionally.

BRIEF DESCRIPTION OF THE DRAWINGS

Exemplary embodiments of the invention are described in detail on the basis of the attached figures.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
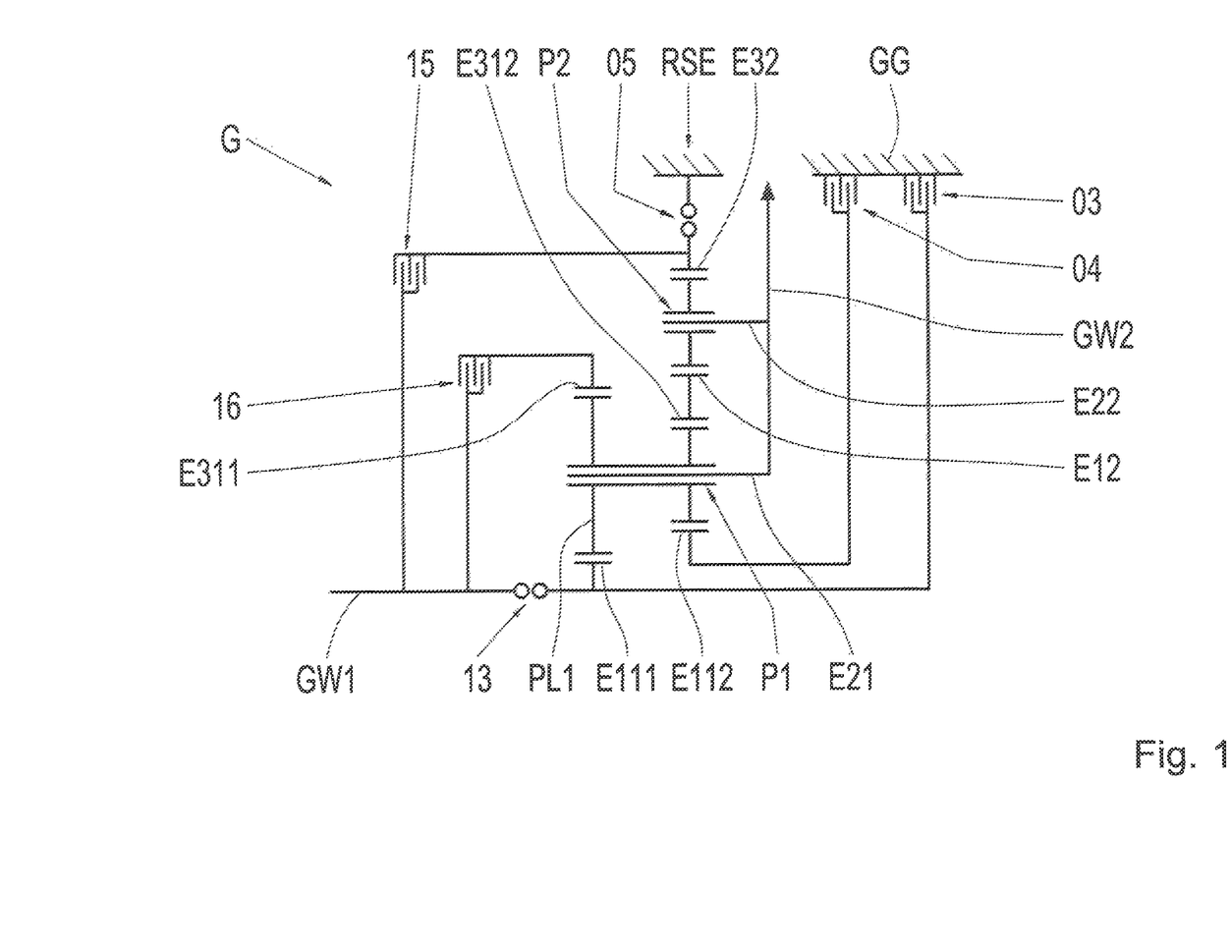
FIG. 1 schematically shows a transmission according to a first exemplary embodiment of the invention.

FIG. 1 schematically shows a transmission G according to a first exemplary embodiment of the invention. The transmission G features a first planetary gear set P1, which is formed as a staged planetary gear set. The transmission G also features a second planetary gear set P2, which is formed as a simple negative gear set. The first planetary gear set P1 features a total of four central gears E111, E112, E311, E312, namely the two central gears E111, E112 formed as sun gears, and the two central gears E311, E312 formed as ring gears. The planetary gears PL1 of the first planetary gear set P1 feature two differently sized effective diameters. The central gear E111 formed as a sun gear meshes with the larger effective diameter of the planetary gears PL1. The central gear E112 formed as a sun gear meshes with the smaller effective diameter of the planetary gears PL1. The central gear E311 formed as a ring gear meshes with the larger effective diameter of the planetary gears PL1. The central gear E312 formed as a ring gear meshes with the smaller effective diameter of the planetary gears PL1. The planetary gears PL1 are rotatably mounted on a carrier E21 of the first planetary gear set P1. A central gear E12, formed as a sun gear, of the second planetary gear set P2 is constantly connected in a torque-proof manner with the central gear E312 of the first planetary gear set P1. Therefore, the two planetary gear sets P1, P2 are connected to each other through a sun gear/ring gear coupling, whereas such coupling is located in one gear set plane RSE, in which both a section of the sun gear and a section of the ring gear are located. A carrier E22 of the second planetary gear set P2 is constantly connected in a torque-proof manner to the carrier E21 of the first planetary gear set P1. Therefore, the two planetary gear sets P1, P2 are operatively connected to each other both through the sun gear/ring gear coupling and also through the connection of the two carriers E21, E22. Thus, the first planetary gear set P1 and the second planetary gear set P2 together have a total of six shafts.

The central gear E111 can be fixed in a torque-proof manner through a first shifting element 03, by being connected in a shiftable manner to a housing GG or to another torque-proof component of the transmission G. The central gear E112 can be fixed in a torque-proof manner in the same manner through a second shifting element 04. The central gear E32, formed as a ring gear, of the second planetary gear set P2 can be fixed in a torque-proof manner in the same manner through a third shifting element 05. A drive shaft GW1 of the transmission G can be connected through a fourth shifting element 15 to the central gear E32 of the second planetary gear set P2. The central gear E311, formed as a ring gear, of the first planetary gear set P1 can be connected through a fifth shifting element 16 to the drive shaft GW1. The central gear E111, formed as a sun gear, of the first planetary gear set P1 can be connected through a sixth shifting element 13 to the drive shaft GW1.

The shifting elements 03, 04, 15, 16 are schematically formed as a force-fitting multi-disk shifting elements. The third shifting element 05 and the sixth shifting element 13 are schematically formed as positive-locking shifting elements. In principle, each of the shifting elements 03, 04, 05, 15, 16, 13 may be formed as a force-fitting or positive-locking shifting element. However, the third shifting element 05 and the sixth shifting element 13 are particularly suitable for being designed as positive-locking shifting elements.

The carriers E21, E22 connected to each other of the two planetary gear sets P1, P2 are constantly connected to an output shaft GW2 of the transmission G. On an outer interface of the output shaft GW2, a toothing (not shown) is provided, which meshes with a toothing of a shaft, not shown, arranged axially parallel to the drive shaft GW2. Thus, the transmission G is suitable for use in a motor vehicle drive train, which is arranged transversely to the direction of travel of the motor vehicle.

Figure 2:
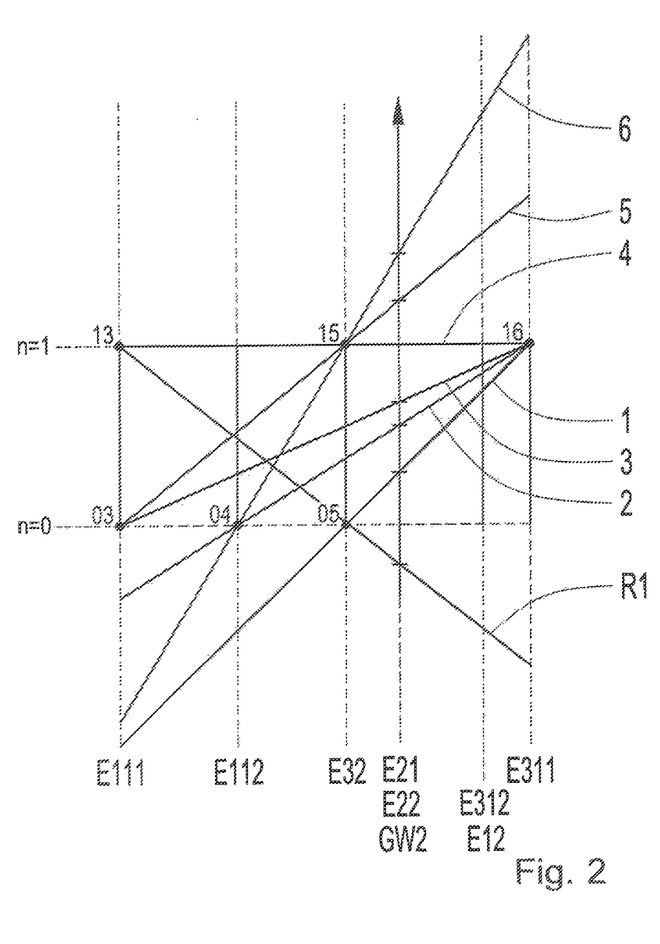
FIG. 2 shows a rotational speed diagram for the transmission according to the first exemplary embodiment.

FIG. 2 shows a rotational speed diagram of the transmission G according to the first exemplary embodiment. Therein, in the vertical direction, the rotational speeds of the six shafts of the transmission G are plotted in relation to the rotational speed n of the drive shaft GW1. The maximum arising rotational speed n of the drive shaft GW1 is normalized to the value of 1. The distances between the six shafts arise from the stationary transmission ratios of the first and second planetary gear sets P1, P2. The central gear E111 formed as a sun gear is a component of the shaft of the transmission G that is first in the order of rotational speeds. The central gear E112 formed as a sun gear is a component of the shaft of the transmission G that is second in the order of rotational speeds. The central gear E32, formed as a ring gear, of the second planetary gear set P2 is a component of the shaft that is third in the order of rotational speeds. Given their constant connection, the two carriers E21, E22 of the two planetary gear sets P1, P2 are to be viewed as a common shaft, and are constantly connected to the output shaft GW2, such that such elements form components of the shaft that is fourth in the order of rotational speeds. Given their constant torque-proof connection, the central gear E312 formed as a ring gear, of the first planetary gear set P1 and the central gear E12, formed as a sun gear, of the second planetary gear set P2 are components of the shaft that is fifth in the order of rotational speeds. The central gear E311 formed as a ring gear is a component of the shaft that is sixth in the order of rotational speeds. The shaft that is first in the order of rotational speeds is allocated with the first shifting element 03 and the sixth shifting element 13. The shaft that is second in the order of rotational speeds is allocated with the second shifting element 04. The shaft that is third in the order of rotational speeds is allocated with the third shifting element 05 and the fourth shifting element 15. The shaft that is sixth in the order of rotational speeds is allocated with the fifth shifting element 16. At a given operating point, associated rotational speed relationships can be connected by a straight line in the rotational speed diagram. If the rotational speeds of two of the six shafts are known, the rotational speeds of the remaining four shafts can be thereby read in the rotational speed diagram. The figure is intended to be illustrative only and is not to scale.

Figure 3:
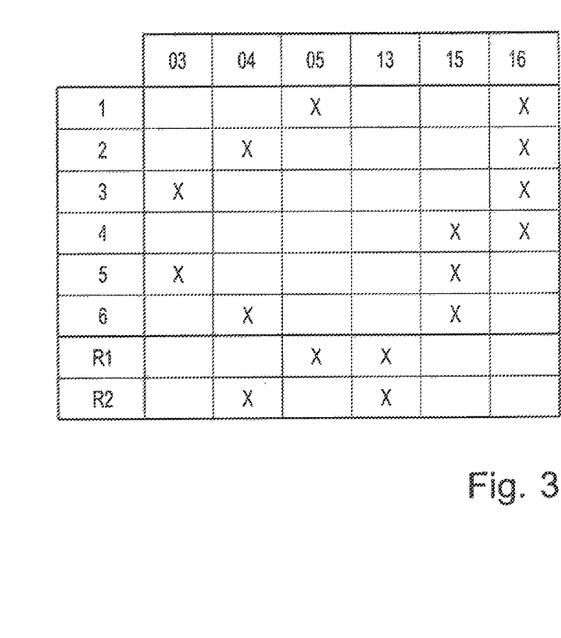
FIG. 3 shows a shifting diagram for the transmission according to the first exemplary embodiment of the invention.

FIG. 3 shows a shifting diagram of the transmission G according to the first exemplary embodiment. In the rows of the shifting diagram, six forward gears 1 through 6 and two reverse gears R1, R2 are shown. In the columns of the shifting diagram, an X marks which of the shifting elements 03, 04, 05, 15, 16, 13, in which forward gear 1 through 6 or the reverse gear R1, R2, are locked. Through the rotational speed diagram shown in FIG. 2, in which the forward gears 1 through 6 and the reverse gear R1 are likewise shown, and through the shifting diagram shown in the figure, the functioning of the transmission G according to the first exemplary embodiment is clear.

Figure 4:
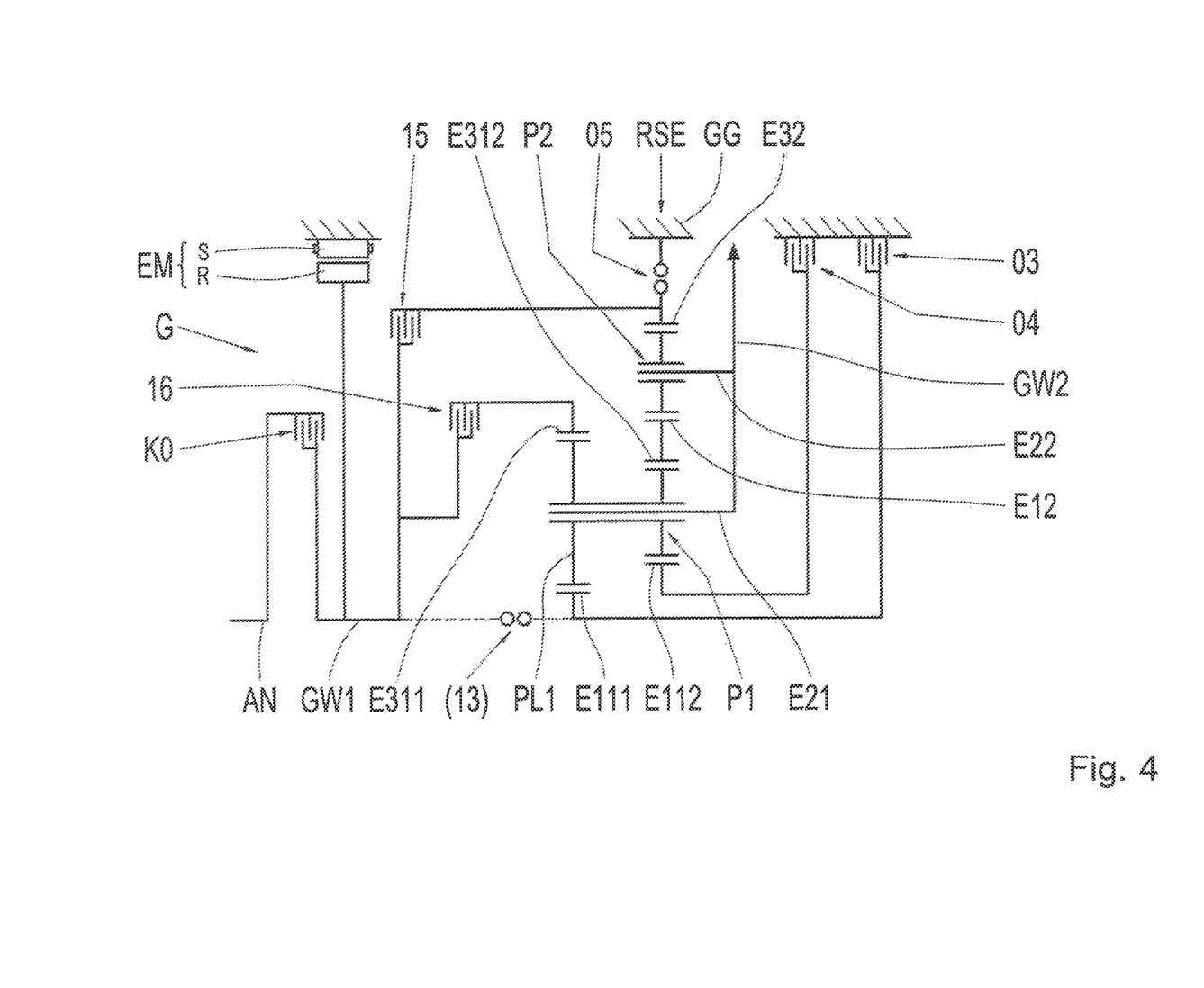
FIG. 4 schematically shows a transmission according to a second exemplary embodiment of the invention.

FIG. 4 schematically shows a transmission G according to a second exemplary embodiment of the invention, which essentially corresponds to the first exemplary embodiment shown in FIG. 1. The transmission G now features an electric motor EM, which comprises a torque-proof stator S and a rotatable rotor R. The rotor R is constantly connected to the drive shaft GW1. The electric motor EM is configured to drive the drive shaft GW1 or receive power from it. Thereby, the transmission G according to the second exemplary embodiment is suitable for use in the drive train of a hybrid vehicle. In order to enable all-electric driving mode, a drive unit external to the transmission can be decoupled from the drive shaft GW1 by a separating clutch K0. The output shaft of the drive unit external to the transmission is then connected to a connecting shaft AN, which is connectable to the drive shaft GW1 through the separating clutch K0. The rotational speed diagram shown in FIG. 2 and the shifting diagram shown in FIG. 3 are also applicable to the second exemplary embodiment shown in FIG. 4.

If the transmission G features an electric motor EM, a reverse rotation of the output shaft GW2 is also possible by reverse rotation of the rotor R counter to a preferred direction of rotation of the drive shaft GW1 and by engaging a forward gear. For this purpose, the separating clutch K0 is open, in order to not also rotate the gear unit external to the transmission backwards. The sixth shifting element 13, which is only required to form a mechanical reverse gear between the drive shaft GW1 and the output shaft GW2, is therefore only optionally required. The provision of the sixth shifting element 13 may be advantageous if, due to external influences, the operation of the electric motor EM is not possible.

Figure 5:
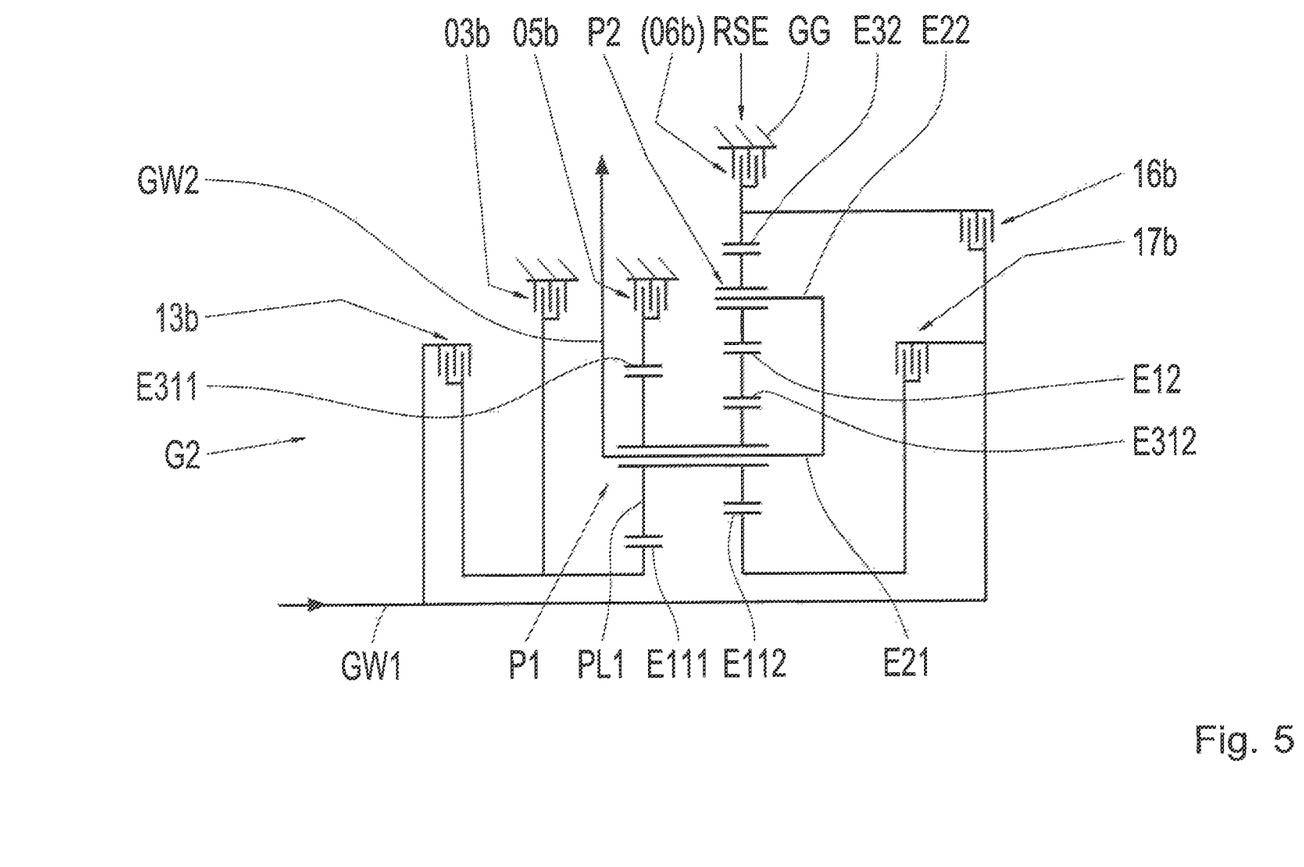
FIG. 5 schematically shows a transmission according to a third exemplary embodiment of the invention.

FIG. 5 schematically shows a transmission G2 according to a third exemplary embodiment of the invention, which, in the same manner, features a first planetary gear set P1 and a second planetary gear set P2. The planetary gear set P1 is in turn formed as a staged planetary gear set and also features four central gears E111, E112, E311, E312. The second planetary gear set P2 is in turn formed as a simple negative gear set and features two central gears E12, E32. Moreover, the coupling of the two planetary gear sets P1, P2 is identical to the coupling of the planetary gear sets P1, P2 according to the first exemplary embodiment. The transmission G2 is significantly different through the allocation of the shifting elements to the various central gears of the transmission G2 and thus also through the formation of gears. The central gear E111 formed as a sun gear, which meshes with the larger effective diameter of the planetary gears PL1, can be fixed in a torque-proof manner through a first shifting element 03b. The central gear E311, formed as a ring gear, which meshes with the larger effective diameter of the planetary gears PL1, can be fixed in a torque-proof manner through a second shifting element 05b. The central gear E111 is also connectable through a third shifting element 13b to the drive shaft GW1 of the transmission G2. The central gear E32, formed as a ring gear, of the second planetary gear set P2 can be connected to the drive shaft GW1 through a fourth shifting element 16b. The central gear E112, formed as a sun gear, which meshes with the smaller effective diameter of the planetary gears PL1, is connectable to the drive shaft GW1 through a fifth shifting element 17b. For the formation of a mechanical reverse gear between the drive shaft GW1 and the output shaft GW2 of the transmission G2, a sixth shifting element 06b can be provided, which is configured to fix the central gear E32, formed as a ring gear, of the second planetary gear set P2 in a torque-proof manner. In the same manner as with the transmission G according to the second exemplary embodiment, the transmission G2 may feature an electric motor EM, the rotating rotor of which is constantly connected to the drive shaft GW1. For decoupling a drive unit external to the transmission, a separating clutch K0 can be provided for this purpose, through which the drive unit external to the transmission is connectable to the drive shaft GW1 of the transmission G2. In this case, the drive unit external to the transmission is connected to a connection shaft AN, which can be connected to the drive shaft GW1 through the clutch K0. For reasons of clarity, this is not shown in the figures.

Figure 6:
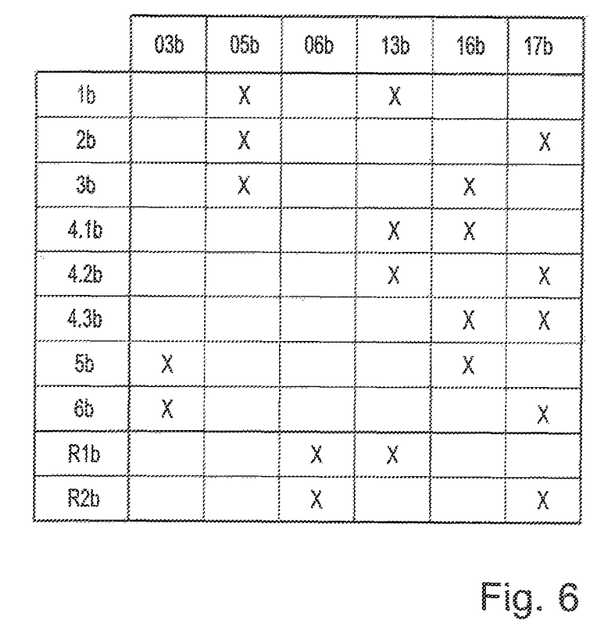
FIG. 6 shows a shifting diagram for the transmission according to the third exemplary embodiment of the invention.

FIG. 6 shows a shifting diagram for the transmission G2 according to the third exemplary embodiment of the invention. In the rows of the shifting diagram, six forward gears 1b through 6b and two reverse gears R1b, R2b are shown. In the columns of the shifting diagram, an X marks which of the shifting elements 03b, 05b, 13b, 16b, 17b, 06b, in which forward gear 1b through 6b or the reverse gear R1b, R2b, are locked. The transmission G2 features a total of three options for forming the fourth forward gear 4b, which are marked in the shifting diagram as 4.1b, 4.2b, 4.3b. In all forward gears 4.1b, 4.2b, 4.3b, the drive shaft GW1 is connected to two of the six shafts of the transmission G2, by which all six shafts of the transmission G2 have the same rotational speed. Thereby, the variant of the fourth forward gear marked as 4.1b is particularly advantageous, since, upon a shifting process of the third forward gear 3b, the fourth shifting element 16b can remain locked and since, upon a shifting process in the fifth forward gear 5b, the third shifting element 13b can remain locked.

Figure 7:
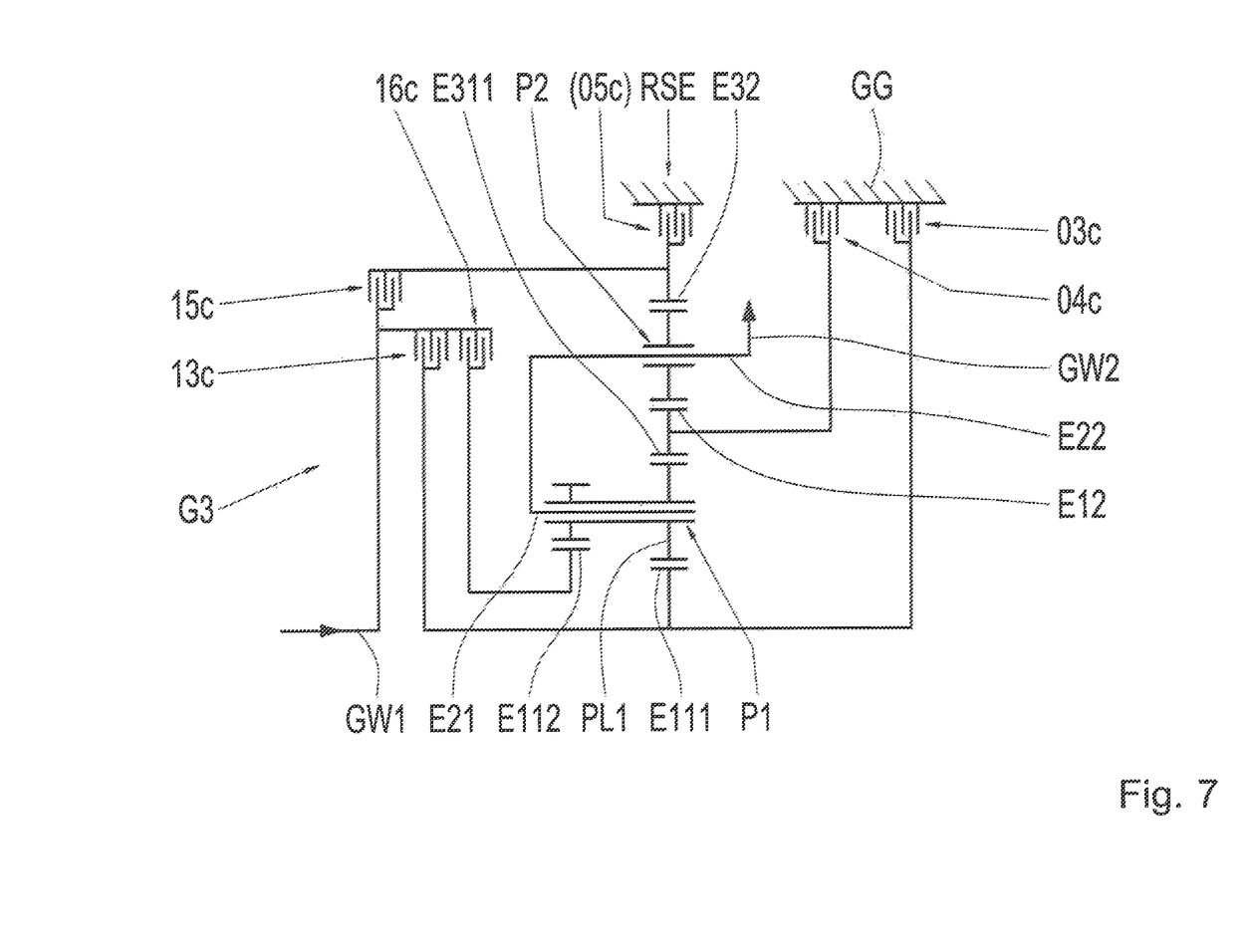
FIG. 7 schematically shows a transmission according to a fourth exemplary embodiment of the invention.

FIG. 7 schematically shows a transmission G3 according to a fourth exemplary embodiment of the invention, which, like the preceding exemplary embodiments, features a first planetary gear set P1 formed as a staged planetary gear set and a second planetary gear set P2 formed as a simple negative planetary gear set. The coupling between the two planetary gear sets P1, P2 in turn takes place by constant torque-proof connections of the two carriers E21, E22 and through a sun gear/ring gear coupling. For this purpose, the central gear E311, formed as a ring gear, of the first planetary gear set P1, which meshes with the larger effective diameter of the planetary gears PL1, is constantly connected in a torque-proof manner to the central gear E12, formed as a sun gear, of the second planetary gear set P2. The transmission G3 features only five shafts in the order of rotational speeds, since only three central gears are allocated to the first planetary gear set P1 with, namely the two central gears E111, E112 formed as sun gears and the central gear E311 formed as a ring gear. The transmission G3 is further distinguished by the fundamentally different allocation of the shifting elements to the now five shafts of the two planetary gear sets P1, P2. The central gear E111 formed as a sun gear, which meshes with the larger effective diameter of the planetary gears PL1, can be fixed in a torque-proof manner through a first shifting element 03c. The sun gear/ring gear coupling between the two planetary gear sets P1, P2 can be fixed in a torque-proof manner through a second shifting element 04c. The central gear E111, formed as a sun gear, is connectable through a third shifting element 13c to the drive shaft GW1 of the transmission G3. The central gear E32, formed as a ring gear, of the second planetary gear set P2 is connectable through a fourth shifting element 15c to the drive shaft GW1. The central gear E112, formed as a sun gear, which meshes with the smaller effective diameter of the planetary gears PL1, is connectable through a fifth shifting element 16c to the drive shaft GW1. If the transmission G3 is to enable the formation of mechanical reverse gears between the drive shaft GW1 and the output shaft GW2, the central gear E32, formed as a ring gear, of the second planetary gear set P2 is to be formed to be fixable in a torque-proof manner. A sixth shifting element 05c is to be provided for this purpose. In the same manner as with the transmission G according to the second exemplary embodiment, the transmission G3 may feature an electric motor EM, the rotating rotor of which is constantly connected to the drive shaft GW1. For decoupling a drive unit external to the transmission, a separating clutch K0 can be provided for this purpose, through which the drive unit external to the transmission is connectable to the drive shaft GW1 of the transmission G3. In this case, the drive unit external to the transmission is connected to a connection shaft AN, which can be connected to the drive shaft GW1 through the clutch K0. For reasons of clarity, this is not shown in the figures.

Figure 8:
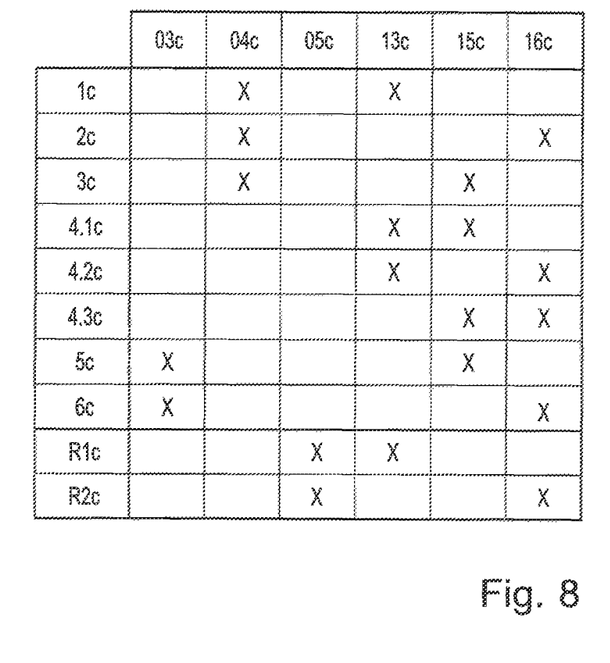
FIG. 8 shows a shifting diagram for the transmission according to the fourth exemplary embodiment of the invention.

FIG. 8 shows a shifting diagram for the transmission G3 according to the fourth exemplary embodiment of the invention. In the rows of the shifting diagram, six forward gears 1c through 6c and two reverse gears R1c, R2c are indicated. In the columns of the shifting diagram, an X marks which of the shifting elements 03c, 04c, 13c, 15c, 16c, 05c, in which forward gear 1c through 6c or the reverse gear R1c, R2c, are locked. The shifting diagram shows three variants, marked as 4.1c, 4.2c, 4.3c, for the formation of the fourth forward gear, in which two of the five shafts of the two planetary gear sets P1, P2 are connected to the drive shaft GW1. The variants, marked as 4.1c and 4.3c, of the fourth forward gear are particularly advantageous, since, upon a shifting process in the third forward gear 3c or in the fifth forward gear 5c, the fourth shifting element 15c may remain locked.

Figure 9:
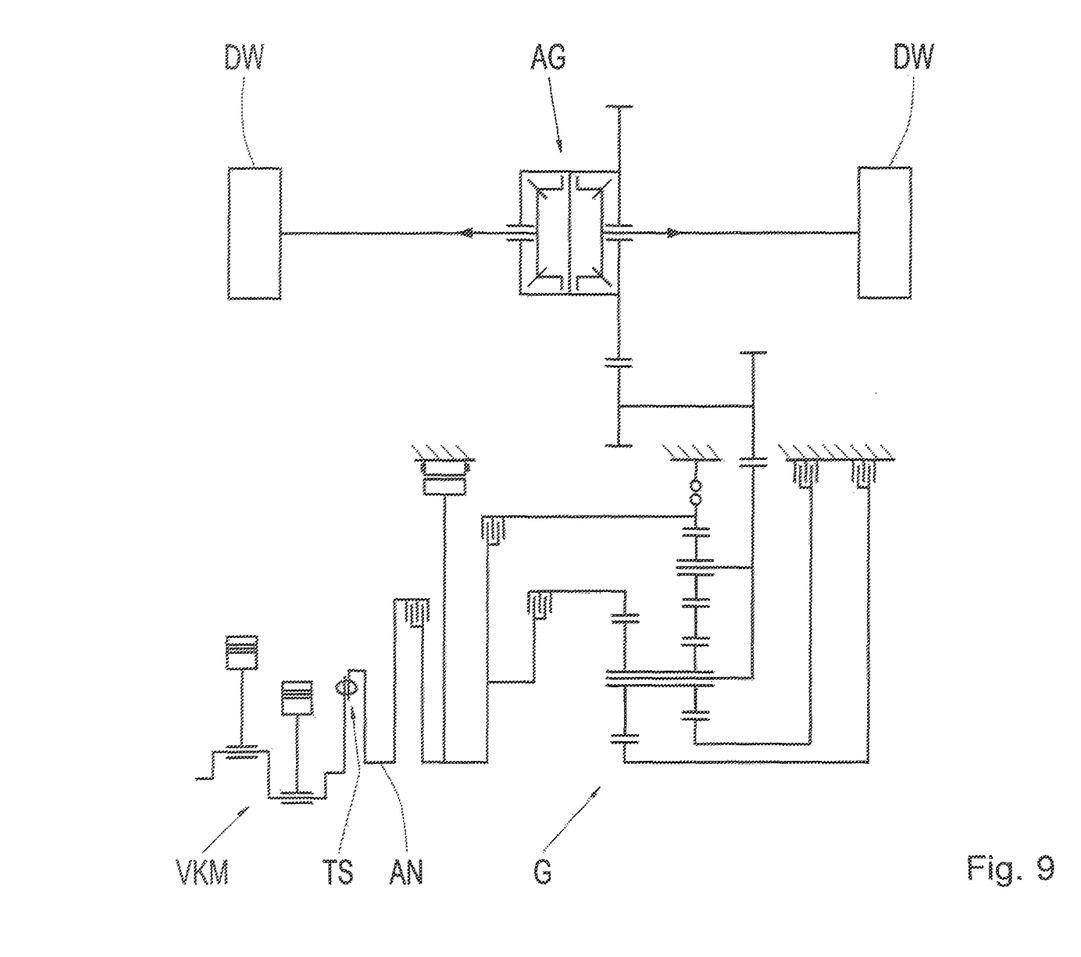
FIG. 9 shows a drive train of a motor vehicle.

FIG. 9 schematically shows a drive train of a motor vehicle with the transmission G according to the second exemplary embodiment shown in FIG. 4. This is to be considered as merely exemplary. The drive train could be designed with any of the listed exemplary embodiments. An internal combustion engine VKM is connected through a torsional vibration damper TS in a torsionally flexible manner to the connecting shaft AN of the transmission G. The output shaft GW2 of the transmission G is connected through an intermediate gear set to an axle drive AG, which distributes the drive power to two drive wheels DW of the motor vehicle.

Modifications and variations can be made to the embodiments illustrated or described herein without departing from the scope and spirit of the invention as set forth in the appended claims.

REFERENCE SIGNS

GG Transmission
G Transmission
P1 First planetary gear set
E111 Central gear of the first planetary gear set
E112 Central gear of the first planetary gear set
E311 Central gear of the first planetary gear set
E312 Central gear of the first planetary gear set
E21 Carrier of the first planetary gear set
PL1 Planetary gears of the first planetary gear set
P2 Second planetary gear set
E12 Central gear of the second planetary gear set
E32 Central gear of the second planetary gear set
E22 Carrier of the second planetary gear set
03 First shifting element
04 Second shifting element
05 Third shifting element
15 Fourth shifting element
16 Fifth shifting element
13 Sixth shifting element
1 First forward gear
2 Second forward gear
3 Third forward gear
4 Fourth forward gear
5 Fifth forward gear
6 Sixth forward gear
R1 Reverse gear
R2 Reverse gear
G2 Transmission
03b First shifting element
05b Second shifting element
06b Third shifting element
13b Fourth shifting element
16b Fifth shifting element
17b Sixth shifting element
R1b Reverse gear
R2b Reverse gear
1b First forward gear
2b Second forward gear
3b Third forward gear
4.1b Fourth forward gear
4.2b Fourth forward gear
4.3b Fourth forward gear
5b Fifth forward gear 6b Sixth forward gear
G3 Transmission
03c First shifting element
05c Second shifting element
04c Third shifting element
13c Fourth shifting element
15c Fifth shifting element
16c Sixth shifting element
1c First forward gear
2c Second forward gear
3c Third forward gear
4.1c Fourth forward gear
4.2c Fourth forward gear
4.3c Fourth forward gear
5c Fifth forward gear
6c Sixth forward gear
R1c Reverse gear
R2c Reverse gear
RSE Gear set plane
GW1 Drive shaft
GW2 Output shaft
EM Electric motor
S Stator
R Rotor
n Rotational speed of the drive shaft
K0 Separating clutch
VKM Internal combustion engine
TS Torsional vibration damper
AG Axle drive
DW Drive wheels Then invention claimed is:

1. A transmission for a motor vehicle, comprising:
a first planetary gear set formed as a stepped planetary gear set, the first planetary gear set having planetary gears of a smaller effective diameter and planetary gears of a larger effective diameter, the first planetary gear set comprising at least three central gears which are formed by one ring gear and two sun gears of the first planetary gear set;
a second planetary gear set comprising two central gears which are formed by one ring gear and one sun gear of the second planetary gear set, one of the central gears of the second planetary gear set is constantly connected in a torque-proof manner to one of the central gears of the first planetary gear set,
wherein the one of the central gears of the second planetary gear set differs from the one of the central gears of the first planetary gear set, the one of the central gears of the second planetary gear set arranged in a common gear set plane with the one of the central gears of the first planetary gear set,
wherein a carrier of the first planetary gear set is constantly connected in a torque-proof manner to a carrier of the second planetary gear set, and
wherein the planetary gears of the larger effective diameter are allocated to a first sun gear of the two sun gears and the planetary gears of the smaller effective diameter are allocated to a second sun gear of the two sun gears.

2. The transmission of claim 1, wherein the carriers of the first and second planetary gear sets are constantly connected to an output shaft of the transmission.

3. The transmission of claim 1, wherein the first planetary gear set comprises an additional central gear which is formed by an additional ring gear.

4. The transmission of claim 1, wherein another one of the central gears of the first planetary gear set is not constantly connected in a torque-proof manner to any of the central gears of the second planetary gear set, the another one of the central gears of the first planetary gear set fixable in a torque-proof manner by a shifting element.

5. The transmission of claim 4, wherein another one of the central gears of the second planetary gear set is not constantly connected in a torque-proof manner to any of the central gears of the first planetary gear set, the another one of the central gears of the second planetary gear set fixable in a torque-proof manner by an additional shifting element.

6. The transmission of claim 1, wherein at least one of the central gears of the first planetary gear set is not constantly connected in a torque-proof manner to any of the central gears of the second planetary gear set, the at least one of the central gears of the first planetary gear set connectable to a drive shaft of the transmission by a shifting element.

7. The transmission of claim 1, wherein another one of the central gears of the second planetary gear set is not constantly connected in a torque-proof manner to any of the central gears of the first planetary gear set, the another one of the central gears of the second planetary gear set connectable to a drive shaft of the transmission by a shifting element.

8. The transmission of claim 1, wherein the sun gear of the second planetary gear set is constantly connected in a torque-proof manner to the ring gear of the first planetary gear set, the ring gear of the first planetary gear set meshes with the planetary gears of the smaller effective diameter.

9. The transmission of claim 8, wherein the first sun gear of the first planetary gear set is fixable in a torque-proof manner by a first shifting element, and the second sun gear of the first planetary gear set is fixable in a torque-proof manner by locking a second shifting element.

10. The transmission of claim 9, wherein the ring gear of the second planetary gear set is fixable in a torque-proof manner by locking a third shifting element.

11. The transmission of claim 10, wherein the ring gear of the second planetary gear set is connectable to a drive shaft of the transmission by locking a fourth shifting element.

12. The transmission of claim 11, wherein the first planetary gear set comprises an additional central gear which is formed by an additional ring gear, the additional ring gear of the first planetary gear set meshes with the planetary gears of the larger effective diameter, the additional ring gear of the first planetary gear set connectable to the drive shaft of the transmission by locking a fifth shifting element.

13. The transmission of claim 12, wherein the transmission is shiftable between six forward gears through selective locking in pairs of the first through fifth shifting elements, wherein
a first forward gear arises by locking the third shifting element and the fifth shifting element,
a second forward gear arises by locking the second shifting element and the fifth shifting element,
a third forward gear arises by locking the first shifting element and the fifth shifting element,
a fourth forward gear arises by locking the fourth shifting element and the fifth shifting element,
a fifth forward gear arises by locking the first shifting element and the fourth shifting element, and
a sixth forward gear arises by locking the second shifting element and the fourth shifting element.

14. The transmission of claim 13, wherein the first sun gear of the first planetary gear set is connectable to the drive shaft of the transmission by locking a sixth shifting element.

15. The transmission of claim 14, wherein the transmission is shiftable to a reverse gear that arises through locking the third shifting element and the sixth shifting element.

16. The transmission of claim 1, further comprising an electric motor with a torque-proof stator and a rotatable rotor, the rotor is constantly connected to a drive shaft of the transmission.

17. A transmission for a motor vehicle, comprising:
a first planetary gear set formed as a stepped planetary gear set, the first planetary gear set having planetary gears of a smaller effective diameter and planetary gears of a larger effective diameter, the first planetary gear set comprising at least three central gears which are formed by two ring gears and one sun gear of the first planetary gear set;
a second planetary gear set comprising two central gears which are formed by one ring gear and one sun gear of the second planetary gear set, one of the central gears of the second planetary gear set is constantly connected in a torque-proof manner to one of the central gears of the first planetary gear set,
wherein the one of the central gears of the second planetary gear set differs from the one of the central gears of the first planetary gear set, the one of the central gears of the second planetary gear set arranged in a common gear set plane with the one of the central gears of the first planetary gear set,
wherein a carrier of the first planetary gear set is constantly connected in a torque-proof manner to a carrier of the second planetary gear set, and
wherein the planetary gears of the larger effective diameter are allocated to a first ring gear of the two ring gears and the planetary gears of the smaller effective diameter are allocated to a second ring gear of the two ring gears.

18. The transmission of claim 17, wherein the carriers of the first and second planetary gear sets are constantly connected to an output shaft of the transmission.

19. The transmission of claim 1, wherein the first planetary gear set comprises an additional central gear which is formed by an additional sun gear.

20. The transmission of claim 17, wherein another one of the central gears of the first planetary gear set is not constantly connected in a torque-proof manner to any of the central gears of the second planetary gear set, the another one of the central gears of the first planetary gear set fixable in a torque-proof manner by a shifting element.

21. The transmission of claim 20, wherein another one of the central gears of the second planetary gear set is not constantly connected in a torque-proof manner to any of the central gears of the first planetary gear set, the another one of the central gears of the second planetary gear set fixable in a torque-proof manner by an additional shifting element.

22. The transmission of claim 17, wherein at least one of the central gears of the first planetary gear set is not constantly connected in a torque-proof manner to any of the central gears of the second planetary gear set, the at least one of the central gears of the first planetary gear set connectable to a drive shaft of the transmission by a shifting element.

23. The transmission of claim 17, wherein another one of the central gears of the second planetary gear set is not constantly connected in a torque-proof manner to any of the central gears of the first planetary gear set, the another one of the central gears of the second planetary gear set connectable to a drive shaft of the transmission by a shifting element.

24. The transmission of claim 17, wherein the sun gear of the second planetary gear set is constantly connected in a torque-proof manner to the second ring gear of the first planetary gear set.

25. The transmission of claim 17, further comprising an electric motor with a torque-proof stator and a rotatable rotor, the rotor is constantly connected to a drive shaft of the transmission.

* * * * *